(12) United States Patent
Basnayake et al.

(10) Patent No.: US 8,744,736 B2
(45) Date of Patent: Jun. 3, 2014

(54) METHOD AND APPARATUS FOR UPDATING TRAVEL TIME ESTIMATION

(75) Inventors: Chaminda Basnayake, Windsor (CA); Fan Bai, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 250 days.

(21) Appl. No.: 13/192,738

(22) Filed: Jul. 28, 2011

(65) Prior Publication Data

US 2013/0030681 A1 Jan. 31, 2013

(51) Int. Cl.
*G08G 1/00* (2006.01)

(52) U.S. Cl.
USPC ............................................. 701/119

(58) Field of Classification Search
USPC ..................... 701/117, 118, 119; 340/905
See application file for complete search history.

(56) References Cited

U.S. PATENT DOCUMENTS

| | | | |
|---|---|---|---|
| 6,329,932 B1 | 12/2001 | Fastenrath | |
| 7,246,007 B2 | 7/2007 | Ferman | |
| 7,454,288 B2 | 11/2008 | Parikh et al. | |
| 7,460,948 B2 | 12/2008 | Van Buer et al. | |
| 7,706,963 B2 | 4/2010 | Parikh et al. | |
| 2001/0029425 A1* | 10/2001 | Myr | 701/200 |
| 2007/0208494 A1* | 9/2007 | Chapman et al. | 701/117 |
| 2007/0233359 A1* | 10/2007 | Ferman et al. | 701/117 |
| 2008/0002574 A1* | 1/2008 | Mosko et al. | 370/229 |
| 2008/0065311 A1* | 3/2008 | Bauchot et al. | 701/117 |
| 2008/0071465 A1* | 3/2008 | Chapman et al. | 701/117 |
| 2009/0045977 A1* | 2/2009 | Bai et al. | 340/905 |
| 2009/0105942 A1 | 4/2009 | Lin | |
| 2009/0182492 A1* | 7/2009 | Alten | 701/200 |
| 2009/0309757 A1* | 12/2009 | Mudalige et al. | 340/905 |
| 2010/0082226 A1* | 4/2010 | Mukherjee | 701/118 |
| 2010/0305814 A1* | 12/2010 | Ichikawa | 701/35 |
| 2011/0035146 A1* | 2/2011 | Guha et al. | 701/201 |
| 2011/0106416 A1* | 5/2011 | Scofield et al. | 701/119 |

OTHER PUBLICATIONS

Szczurek, P.; Xu, B.; Wolfson, O.; Rishe, N.; Prioritizing Travel Time Reports in Peer-to-Peer Traffic Dissemination. International Symposium on Communication Systems, Networks and Digital Signal Processing CSNDSP, pp. 454-458, Jul. 2010.

Lakas, A.; Cheqfah, M.; Detection and Dissipation of Road Traffic Congestion Using Vehicular Communication. Mediterranean Microwave Symposium MMS, pp. 1-6, Nov. 2009.

\* cited by examiner

*Primary Examiner* — Darnell Jayne
*Assistant Examiner* — Stanton L Krycinski

(57) ABSTRACT

A self-contained vehicular traffic travel time information system for a vehicle in an inter-vehicle ad-hoc network includes an on-board vehicular broadcasting unit for communicating with other vehicles within the inter-vehicle ad hoc network. A positioning device identifies the vehicle's position throughout a course of travel. An on-board vehicle processing unit stores road segments throughout the vehicle path of travel. The on-board vehicle processing unit determines a starting position and an ending position for each respective road segment. A length of time for traveling through each respective road segment is determined. A memory storage device stores the segmented road portions and the time of travel associated with each respective road segment. The on-board vehicular broadcasting unit disseminates the determined travel times of recently traveled road segments via a broadcast message to other vehicles within the inter-vehicle ad hoc network.

21 Claims, 3 Drawing Sheets

METHOD AND APPARATUS FOR UPDATING TRAVEL TIME ESTIMATION

BACKGROUND OF INVENTION

An embodiment relates generally to vehicle-to-vehicle communications and travel time management information.

It is known in the prior art to use vehicles as probes for measuring traffic conditions in real-time. Individual vehicles provide "floating car data," such as, for example, the vehicle's time, speed, position, and heading, which can be used to estimate travel time and traffic speed. This can in turn be used to alert other operators to an approaching condition variance, as an indicator of road network status, as a basis for detecting incidents, or as input for a dynamic route guidance system.

Such prior art systems communicate their data to a centralized data processing center for determining traffic flow and congestion on traveled roads. The issue with such a system is that there must be a third party entity that must absorb the cost of operating and maintaining a centralized data processing center. If the centralized data processing center becomes offline for any reason, traffic flow updates would not be available.

SUMMARY OF INVENTION

An advantage of an embodiment is a self-contained vehicle travel time information system that is independently operated by each vehicle within an inter-vehicle ad-hoc network. Each vehicle within the network identifies segments of a traveled route and then determines a travel time estimation for each segment of the traveled route. The travel time estimation is broadcast to surrounding vehicles within the network, including oncoming traffic, so that such the travel times of the roads driven by a vehicle may be disseminated to other vehicles to assist in their travels along the same road segments. Historical data, from both the vehicle determining the travel time data and remote vehicles broadcasting such data, may be stored and recalled for in estimating travel times for the road segments. The system described herein does not require a centralized data processing center. Rather, each vehicle is capable of identifying road segments independently and calculating travel times for those road segments. In addition, each vehicle may store and utilize historical data in cooperation with the data currently obtained for determining the congestion of traffic flow along the traveled roads. The determined traffic flow information is broadcast to surrounding vehicles to alert other vehicles in the vicinity of the travel times of the roads.

An embodiment contemplates a self-contained vehicular traffic travel time information system for a vehicle in an inter-vehicle ad-hoc network. An on-board vehicular broadcasting unit includes a transmitter and receiver for communicating with other vehicles within the inter-vehicle ad hoc network. A positioning device determines the vehicle's position throughout a course of travel. An on-board vehicle processing unit stores road segments throughout the vehicle path of travel. The on-board vehicle processing unit determines a starting position and an ending position for each respective road segment. A length of time is determined for traveling through each respective road segment. A memory storage device stores the segmented road portions and the time of travel associated with each respective road segment. The on-board vehicular broadcasting unit disseminates the determined travel times of recently traveled road segments via a broadcast message to other vehicles within the inter-vehicle ad hoc network.

DETAILED DESCRIPTION

Figure 1:
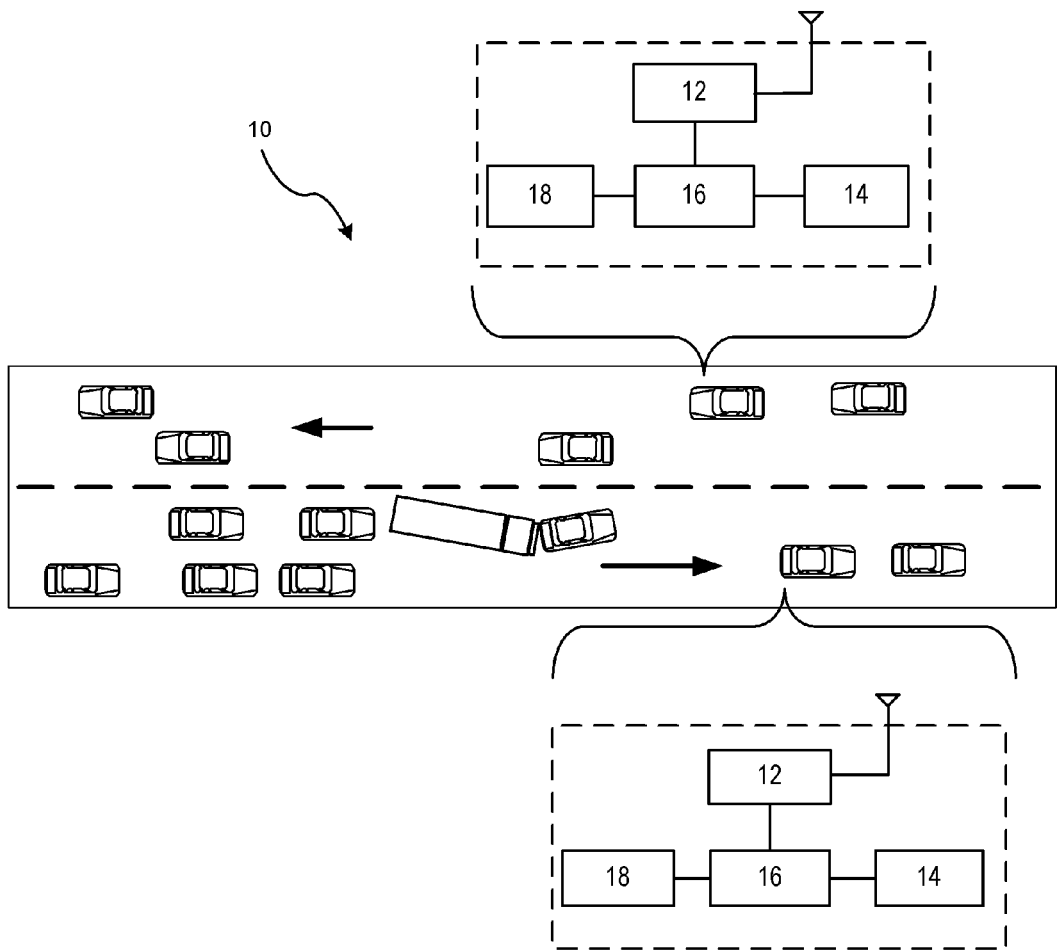
FIG. 1 is a block diagram of an inter vehicle communication system.

There is shown in FIG. 1 an inter-vehicle communication system 10 for an inter-vehicle ad-hoc network. Each vehicle within the inter-vehicle communication system 10 includes an on-board vehicular broadcasting unit 12, a positioning device 14, and on-board vehicle processing unit 16, and memory storage device 18.

The on-board vehicular broadcasting unit 12 includes a transmitter and receiver for communicating with a remote vehicle within the inter-vehicle ad hoc network. It should be understood that each vehicle considers itself a host vehicle and other vehicles that it is in communication with as remote vehicles. A host vehicle will broadcast travel times of road segments to remote vehicles. The travel times are either determined by the host vehicle or determined by a remote vehicle and are re-broadcast by the host vehicle after it is received by the host vehicle.

The memory storage device 18 is used to store travel times of road segments determined by the host vehicle and the travel times of road segments received from remote vehicles. These stored travel times may be used as historical data for travel time estimations.

The positioning device 14 is used to determine a vehicle's position throughout a course of travel. The positioning device 14 may be a GPS device or any other positioning device that may provide vehicle position coordinates along a traveled route.

The on-board vehicle processing unit 16 in cooperation with the positioning device 14 determines road segments throughout the host vehicle's path of travel. The on-board vehicle processing unit 16 determines a starting position and an ending position for each respective road segment and determines a length of time for traveling through each respective road segment.

An initial starting position for a traveled route is identified when the host vehicle is started, such as detecting an ignition start operation. The location of the starting position as identified by the positioning device 14 is stored in the memory storage device 18. The on-board vehicle processing unit 16 then determines an ending position for a first road segment. The ending position may be determined by a plurality of factors such as, but not limited to, a steering maneuver greater than a predetermined number of degrees (e.g., 30 degree wheel pivot), transitioning a vehicle speed from a first speed range and a second speed range, or the vehicle traveling a fixed distance from the starting position.

The on-board vehicle processing unit 16 identifies a starting position for a subsequent road segment by using the ending position of the previous road segment. That is, the ending position of the previous road segment will be the starting position of the subsequent road segment.

In addition, starting positions and the ending positions for a respective segment may also be determined from historical data by statistically sampling starting points and ending points for a respective segment and collectively determining a starting point and an ending point of the segment traveled by the vehicle.

The on-board vehicle processing unit 16 in cooperation with the positioning device 14 determines the travel time, which is the time that it takes the vehicle to travel the distance of a road segment from a respective starting point to a respective ending point. In addition to time, other parameters may be determined by the on-board vehicle processing unit 16 in cooperation with the positioning device 14 such as, but not limited to, in-segment average speed, distance traveled, time-of-day that the segment is traveled, and the day type (e.g., week/weekend/holiday). Such parameters may be used to enhance the real-time operations of travel time through the road segments. For example, identifying a nominal travel times throughout the course of a day may help in distinguishing peak travel times. Understanding when these peak travel times occur may be used in correlation with the current travel time to assist in understanding whether the current travel time is an anomaly (e.g., an accident) or part of a typical delay in travel due to the volume of traffic.

A first vehicle traveling in a first direction of travel may broadcast its determined travel time data relating to the road segments to a second vehicle traveling in an opposite direction. Thereafter, the second vehicle traveling in the opposite direction broadcasts the travel time data to vehicles preceding the first vehicle that are traveling in a same direction of the first vehicle. As a result, the vehicles preceding the first vehicle traveling in a same direction are forewarned of any congestions in the flow of traffic by providing them with calculated travel time data of the traveled road segments ahead of them.

Figure 2:
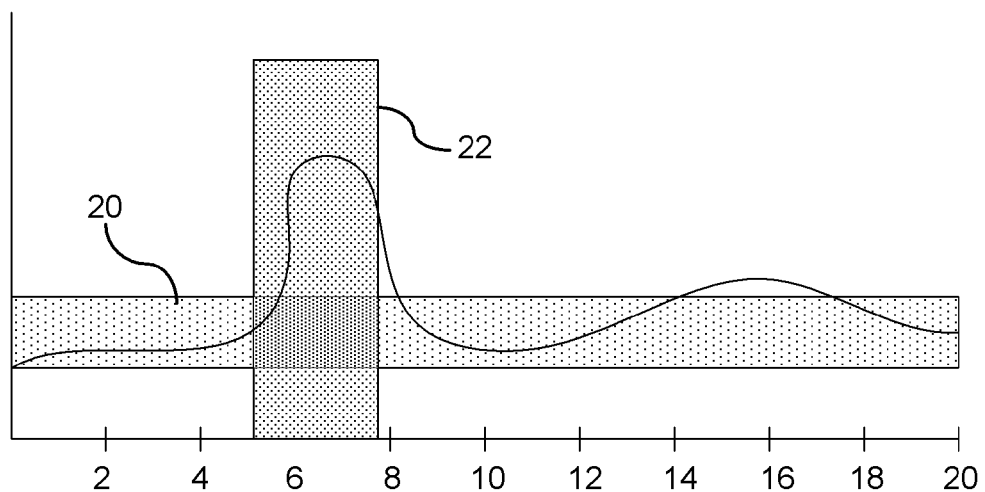
FIG. 2 is an exemplary histogram illustrating nominal and peak flow travel times.

FIG. 2 illustrates an exemplary histogram illustrating nominal and peak flow travel times. Shaded segment 20 represents the nominal travel time and shaded segment 22 represents the nominal peak flow time. As a result, the histogram can assist in identifying whether the current travel time for a vehicle is normal or unordinary.

Figure 3:
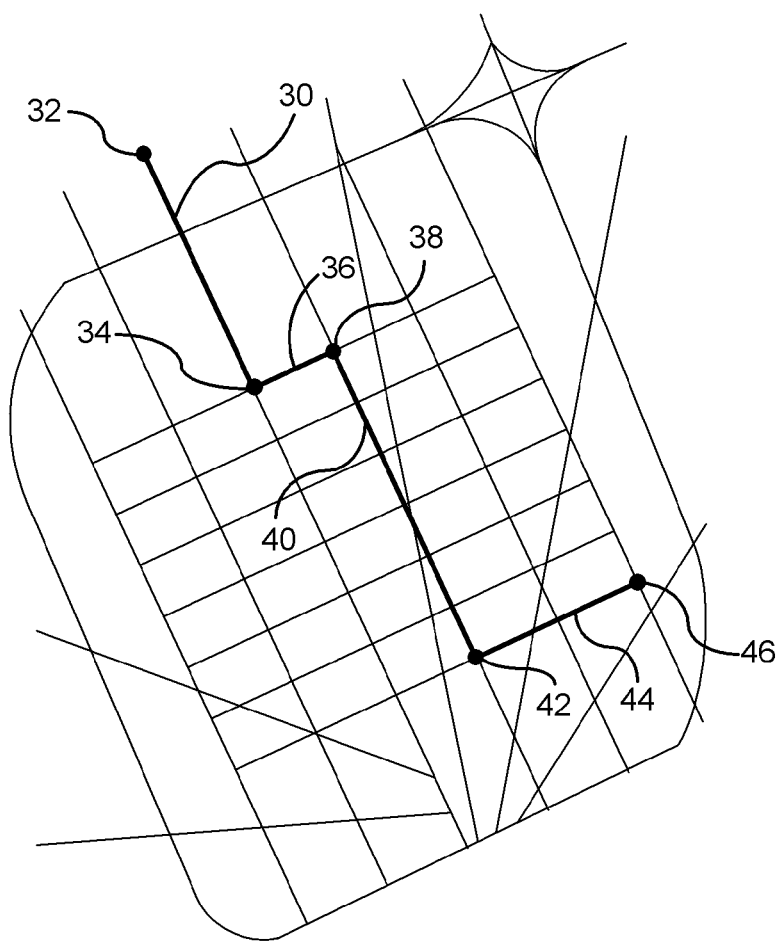
FIG. 3 is an exemplary diagram of a segmented route traveled by a vehicle.

FIG. 3 illustrates the identified road segments for a traveled route. The road segments are determined using the different techniques described herein or may be identified using historical data. In FIG. 3, the first road segment is illustrated generally by 30. The first road segment 30 has a starting point 32 and an ending point 34. The second road segment 36 is has a starting point 32, which is the ending point of the first road segment 30, and an ending point 38. The fourth road segment 40 has a starting point 38 and an ending point 42. The final road segment 44 has a starting point 42 and an ending point 46. The time of travel for each road segment is determined utilizing the on-board processing unit 16 and the positioning device 14 which identifies the respective starting and ending points for a respective segment and determines the amount of time it takes the vehicle to travel from the respective starting point to the respective ending point. As a result, the travel time data for each road segment is self-generated. That is, the system described herein does not require a centralized data processing center that all vehicle's store and or retrieve records from. Records may be generated by the self-generated data and stored in the memory storage database 18 that identify the starting position and ending position, the travel time, the average speed, the distance traveled, time of day data recorded, and day type. Each vehicle may broadcast its calculated travel time for each segment to other vehicles within the communication network or may re-broadcast travel times of segments that are received by other remote vehicles. Similar records can also be generated and stored within the memory storage database 18 using the data received from other vehicles. Since each vehicle has the capability of determining travel times based on its own travel or from historical data shared directly from other vehicles, the expense and maintenance of a centralized entity or database for maintaining records is not required.

Each vehicle can independently estimate a congestion status (e.g., travel time) of all the road segments that comprise the traveled route of the vehicle. A vehicle may utilize the time of travel as it is measured/calculated or the vehicle may factor historical data into the calculation. By incorporating historical data and applying weights to the both the historical data and current data, anomalies may be identified and factored accordingly. That is, if there was a one-time incident that is causing a delay, then a vehicle may want to generate a travel time that is not based solely on the one-time delay. A formula for determining travel time utilizing weighted historical data is as follows:

$$\hat{T}_{Segment}(t) = \alpha T_{Segment}(t) + \beta(\hat{T}_{Segment}(t-1))$$

where $\hat{T}_{Segment}(t)$ is a travel time for a current traveled segment at time (t), $\alpha$ is a first aggregating function; $T_{Segment}(t)$ are travel time records received from others for the current traveled segment; $\beta$ is a second aggregating function; $\hat{T}_{Segment}(t-1)$ is historical time data record for a respective segment. The first and second aggregate functions are weighting factors where each weighting factor applies an amount of weight that is to given to either the current data or the historical data. The weighting factor may be predetermined or generated and add up to 1.

Figure 4:
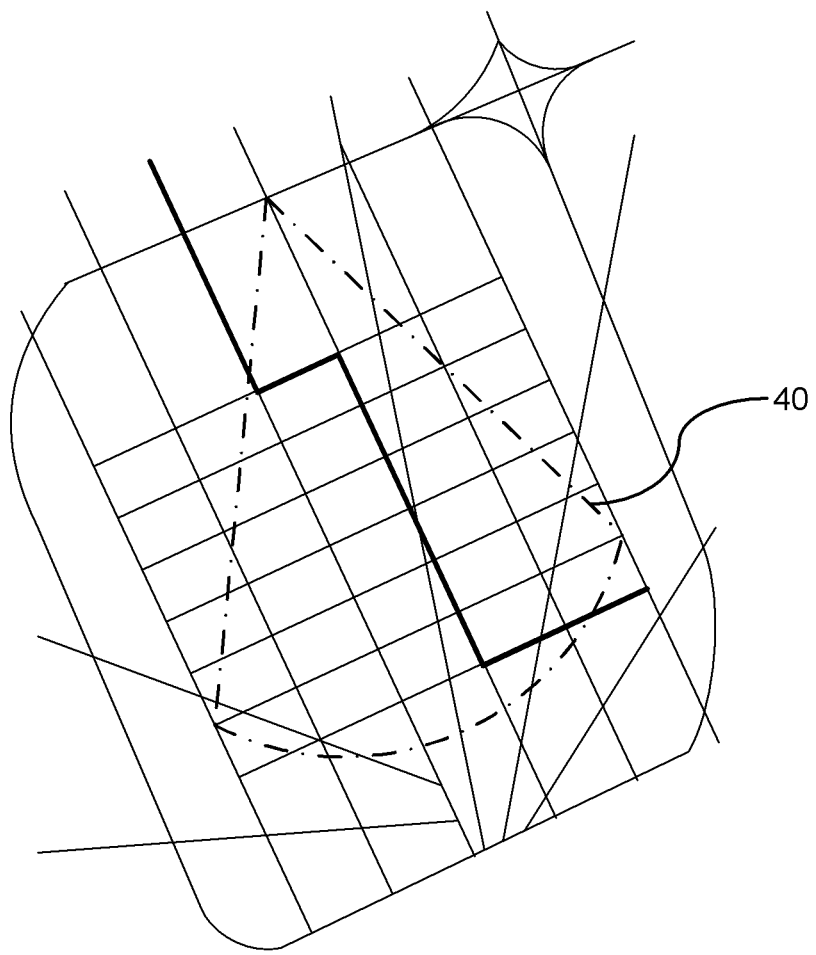
FIG. 4 is an exemplary diagram of a region of interest used to broadcast travel time data.

The travel time broadcast by a host vehicle to a remote vehicle may be disseminated based on a spatial scope or a temporal scope. A spatial scope disseminates data to a region of interest. An example of a broadcast region of interest 40 is illustrated in FIG. 4. It should be understood that the region of interest 40 as shown in FIG. 4 is for illustrative purposes only, and may include other shapes/regions than what is shown. When disseminating travel time data based on a spatial scope, the travel time data is broadcast only when the vehicle is within the region of interest 40. If the vehicle is outside of the region of interest 40, then the time travel data is no longer transmitted. Alternatively, if a message is transmitted while the vehicle is out of the region of interest 40, then the message containing the time of travel data is discarded if received.

A temporal scope disseminates messages containing time travel data based on whether a predetermined period of time has elapsed. If the predetermined period of time is not elapsed, then the message containing the travel time data is broadcast. A respective message may be re-broadcast while the predetermined period is running.

The message may also be broadcast based on prioritization. Respective segments are weighted differently based on a utilization of the traveled segment. That is, respective segments that have a greater significance than other segments are provided a greater weight for broadcasting the message. For example, a more utilized road may be provided a greater weight than a less utilized road. Therefore, if a vehicle has received a plurality of messages, the vehicle can prioritize which message has greater priority and broadcast first those messages having greater priority.

Moreover, when estimating a travel time for a segment, all travel time from a segment may be factored and weighted. A vehicle may receive multiple travel time data of a same road segment from multiple vehicles and multiple travel time data from a same vehicle (i.e., a same vehicle re-broadcasts the message). The travel time data may be first-hand information derived by the host vehicle or may be second-hand information derived by remote vehicles. An estimation of travel time from a plurality of messages of independent estimation messages is represented by the following formula:

$$\tilde{T}_{Link} = \frac{\sum_{i=1}^{n} \frac{U_i(t,d)}{R_i} T_{Link}^i}{\sum_{i=1}^{n} \frac{U_i(t,d)}{R_i}}$$

where $U_i$ is a utility value (or confidence level) of an respective travel time message by vehicle i, $T_{Link}^i$ is a time of travel estimation for one of the messages received from the $i^{th}$ vehicles; and $R_i$ is a replication punishment value of this travel time estimation message. Particularly, as a travel estimation message is being replicated in the gossip spread process, this $R_i$ value of this newly replicated message is monotonically increased, in order to reduce the weight of this newly replicated message.

While certain embodiments of the present invention have been described in detail, those familiar with the art to which this invention relates will recognize various alternative designs and embodiments for practicing the invention as defined by the following claims.

What is claimed is:

1. A self-contained vehicular traffic travel time information system for a vehicle in an inter-vehicle ad-hoc network, comprising:
    an on-board vehicular broadcasting unit including a transmitter and receiver for communicating with other vehicles within the inter-vehicle ad hoc network;
    a positioning device for determining the vehicle's position throughout a course of travel;
    an on-board vehicle processing unit for storing road segments throughout the vehicle path of travel, the on-board vehicle processing unit determining a starting position and an ending position for each respective road segment, and determining a length of time for traveling through each respective road segment; and
    a memory storage device for storing the segmented road portions and the time of travel associated with each respective road segment;
    wherein the on-board vehicular broadcasting unit disseminates the determined travel times of recently traveled road segments via a broadcast message to other vehicles within the inter-vehicle ad hoc network, wherein a travel time estimation for a respective segment is determined by the time of travel of the vehicle traveling through the segment and historical time of travel obtained for the segment, the travel time estimation represented by the formula:

$$\hat{T}_{Segment}(t) = \alpha T_{Segment}(t) + \beta(\hat{T}_{Segment}(t-1))$$

wherein $\hat{T}_{Segment}(t)$ travel time for a current traveled segment at time (t), $\alpha$ is a first aggregating function, $T_{Segment}(t)$ are travel time records received from others for the current traveled segment, $\beta$ is a second aggregating function, $\hat{T}_{Segment}(t-1)$ is historical time data record for a respective segment.

2. The system of claim 1 wherein coincidence of the vehicle with the starting position and the ending position for a segment is detected in response to position coordinates generated by the positioning device.

3. The system of claim 2 wherein the starting position of a first segment is determined by a location of the vehicle as identified by the positioning device during an ignition start operation.

4. The system of claim 3 wherein the ending position for a respective segment is determined when the vehicle executes a steering maneuver greater than a predetermined number of degrees.

5. The system of claim 3 wherein the ending position for a respective segment is determined when a speed of the vehicle transitions from a first speed range to a second speed range.

6. The system of claim 3 wherein the ending position for a respective segment is determined by a location of the vehicle as identified by the positioning device based on a fixed distance the vehicle has traveled from a respective starting position.

7. The system of claim 3 wherein a starting position for a subsequent segment occurs at an end of a previous segment.

8. The system of claim 3 wherein a time-of-day that the vehicle travels through the segment is maintained in the memory storage device.

9. The system of claim 3 wherein segments of previously traveled routes are stored in the memory storage device, wherein the identified segments of previously traveled routes are downloaded when a respective route is re-traveled.

10. The system of claim 1 wherein broadcasting the message is based on the vehicle broadcasting the message while the vehicle is positioned within a region of interest.

11. The system of claim 10 wherein the message is re-broadcast by the vehicle while the vehicle is within the region of interest.

12. The system of claim 10 wherein the message is discarded from being broadcast when the vehicle is outside of the region of interest.

13. The system of claim 1 wherein broadcasting the message is based on whether a predetermined period of time is elapsed, wherein the message is broadcast while the predetermined period of time is not elapsed.

14. The system of claim 1 wherein broadcasting the message is based on a prioritization, wherein respective segments are weighted differently based on a utilization of the traveled segment, where the respective segments having a greater weight are provided prioritization with respect to broadcasting the message.

15. The system of claim 1 wherein the vehicle receives at least one time of travel estimation message for a segment from the other vehicles, wherein the vehicle re-broadcasts the travel times relating to the segment.

16. The system of claim 1 wherein the vehicle receives a plurality of time of travel estimation messages relating to a same set of segments for a respective road from the other vehicles, wherein the time of travel estimation for the traveled road utilizing the plurality of time of travel estimation messages is determined by the following formula:

$$\tilde{T}_{Link} = \frac{\sum_{i=1}^{n} \frac{U_i(t,d)}{R_i} T_{Link}^i}{\sum_{i=1}^{n} \frac{U_i(t,d)}{R_i}}$$

where $U_i$ is a confidence level of an respective travel time message by vehicle i, $T_{Link}^i$ is a time of travel estimation for one of the messages received from the $i^{th}$ vehicles; and $R_i$ is a replication punishment value of the $i^{th}$ travel time estimation message.

17. The system of claim 16 wherein the plurality of received messages include starting points and ending points for the respective segments, and wherein the vehicle statistically samples the starting points and ending points for the respective segment for collectively determining a starting point and ending point of the segment traveled by the vehicle.

18. The system of claim 1 wherein the on-board processing unit utilizes position data from the positioning device for determining a distance traveled for a respective segment.

19. The system of claim 1 wherein the on-board processing unit utilizes the starting position and ending position of a segment for determining an average speed of the respective segment.

20. The system of claim 1 wherein a time-of-day the vehicle travels along a respective segment is recorded and associated with the travel time of the respective segment.

21. A self-contained vehicular traffic travel time information system for a vehicle in an inter-vehicle ad-hoc network, comprising:
- an on-board vehicular broadcasting unit including a transmitter and receiver for communicating with other vehicles within the inter-vehicle ad hoc network;
- a positioning device for determining the vehicle's position throughout a course of travel;
- an on-board vehicle processing unit for storing road segments throughout the vehicle path of travel, the on-board vehicle processing unit determining a starting position and an ending position for each respective road segment, and determining a length of time for traveling through each respective road segment; and
- a memory storage device for storing the segmented road portions and the time of travel associated with each respective road segment;

wherein the on-board vehicular broadcasting unit disseminates the determined travel times of recently traveled road segments via a broadcast message to other vehicles within the inter-vehicle ad hoc network, wherein the vehicle receives a plurality of time of travel estimation messages relating to a same set of segments for a respective road from the other vehicles, wherein the time of travel estimation for the traveled road utilizing the plurality of time of travel estimation messages is determined by the following formula:

$$\tilde{T}_{Link} = \frac{\sum_{i=1}^{n} \frac{U_i(t, d)}{R_i} T_{Link}^i}{\sum_{i=1}^{n} \frac{U_i(t, d)}{R_i}}$$

where $U_i$ is a confidence level of an respective travel time message by vehicle i, $T_{Link}^i$ is a time of travel estimation for one of the messages received from the $i^{th}$ vehicles; and $R_i$ is a replication punishment value of the $i^{th}$ travel time estimation message.

* * * * *